United States Patent [19]
Eaton et al.

[11] Patent Number: 6,091,064
[45] Date of Patent: Jul. 18, 2000

[54] SAFETY SYSTEM WITH INTERMITTENT PHOTOELECTRIC BEAM

[75] Inventors: David R. Eaton, Lomira; Thomas C. Hartmann, Prairie du Sac, both of Wis.

[73] Assignee: Tab Products Company, Palo Alto, Calif.

[21] Appl. No.: 09/087,989

[22] Filed: Jun. 1, 1998

[51] Int. Cl.[7] ........................................ G01V 9/04
[52] U.S. Cl. .................... 250/221; 250/222.1; 312/201
[58] Field of Search ................. 250/221, 222.1; 340/555, 556, 557, 567; 312/198, 200, 201

[56] References Cited

U.S. PATENT DOCUMENTS 5,359,191 10/1994 Griesemer et al. ................... 250/221
5,569,910 10/1996 Griesemer ............................ 250/221

*Primary Examiner*—Seungsook Ham
*Assistant Examiner*—Kevin Pyo
*Attorney, Agent, or Firm*—Donald Cayen

[57] ABSTRACT

A safety system for high density mobile storage utilizes a photoelectric transmitter that cyclically emits an intermittent beam at a predetermined frequency into an aisle adjacent a mobile carriage. Two or more transmitters can be arranged in each of one or more clusters on the carriage. The intermittent beams are directed to photoelectric receivers across the aisle. Each receiver sends a signal to reset an associated counter each time the receivers detect an intermittent beam. As long as every receiver detects at least one intermittent beam at the predetermined frequency, the mobile carriage is enabled to move. The receivers can be on the same mobile carriage as the transmitter to protect a vertical plane close and parallel to the front face of the carriage.

11 Claims, 6 Drawing Sheets

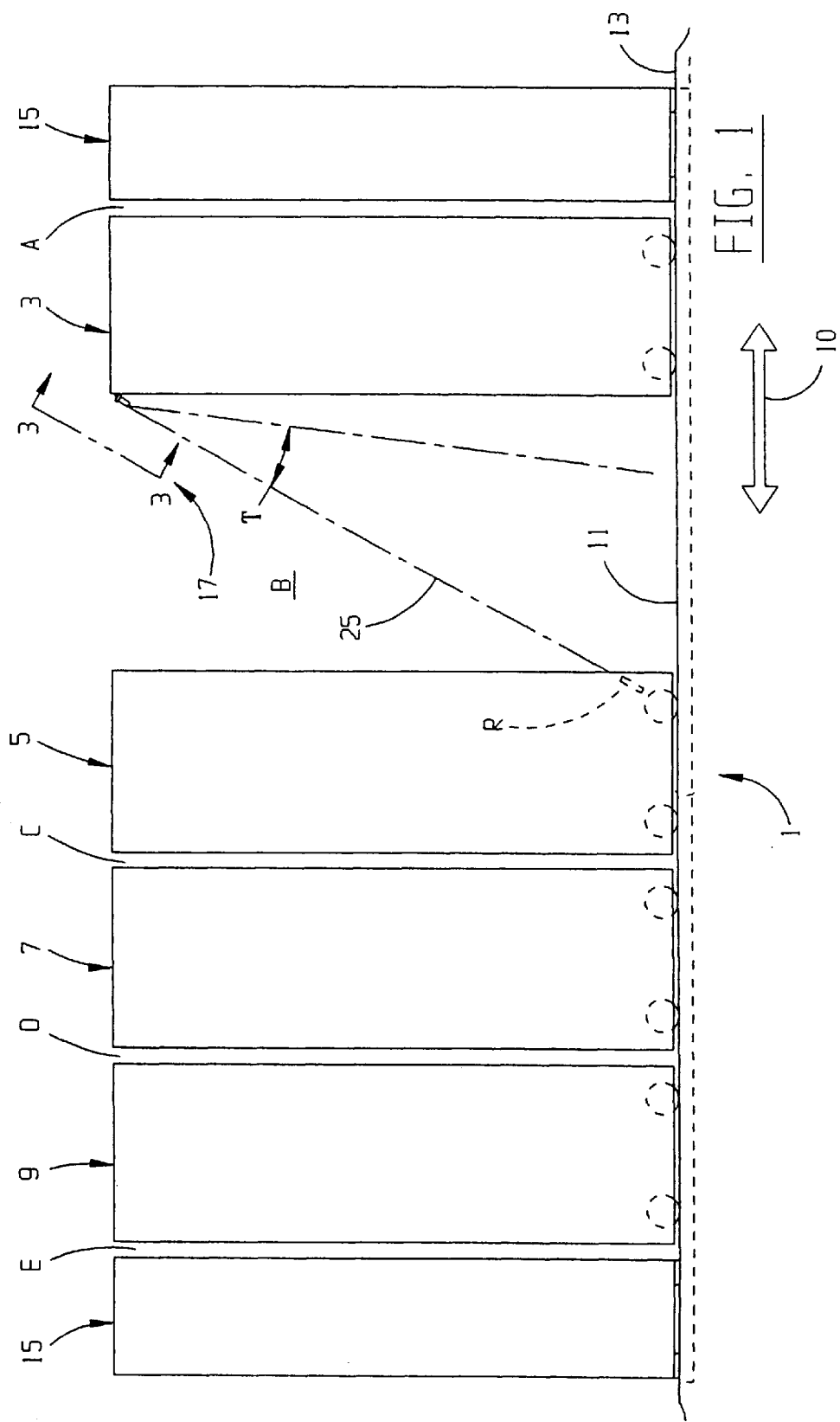

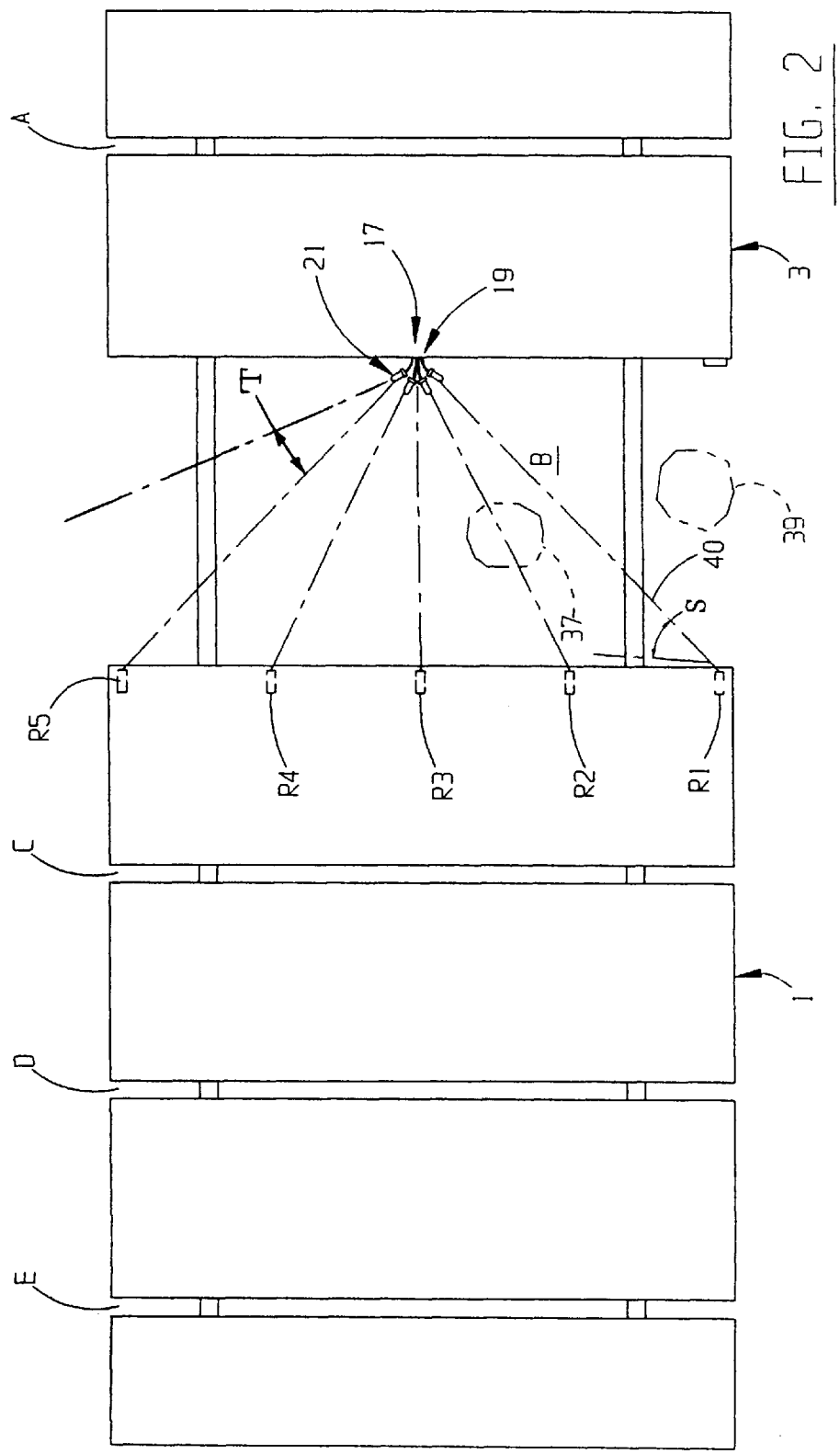

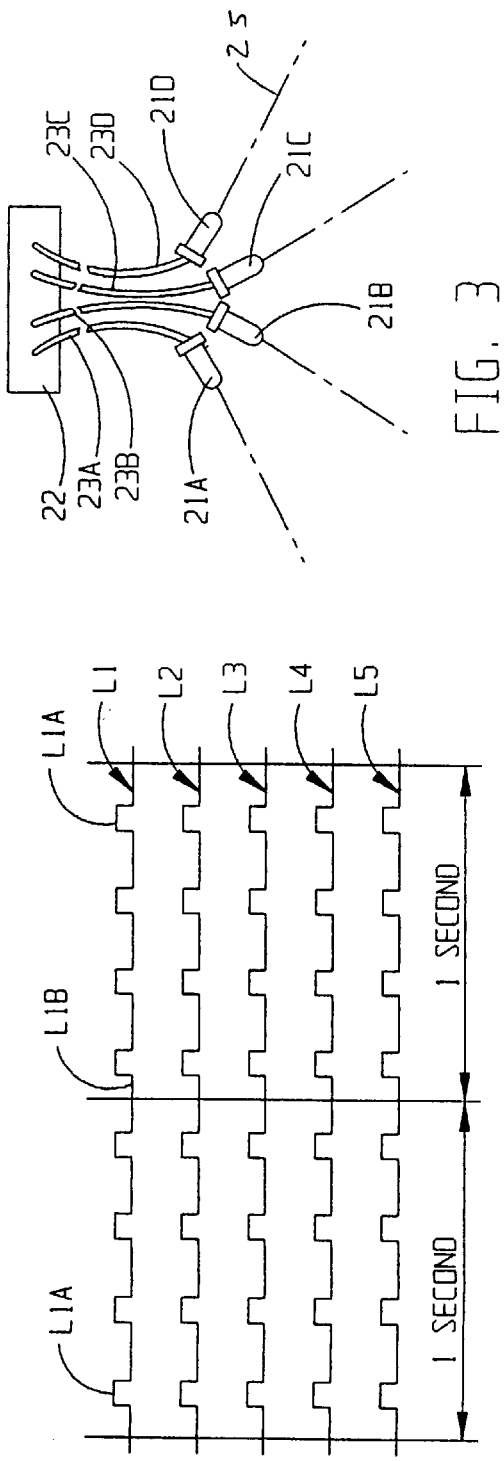
FIG. 4
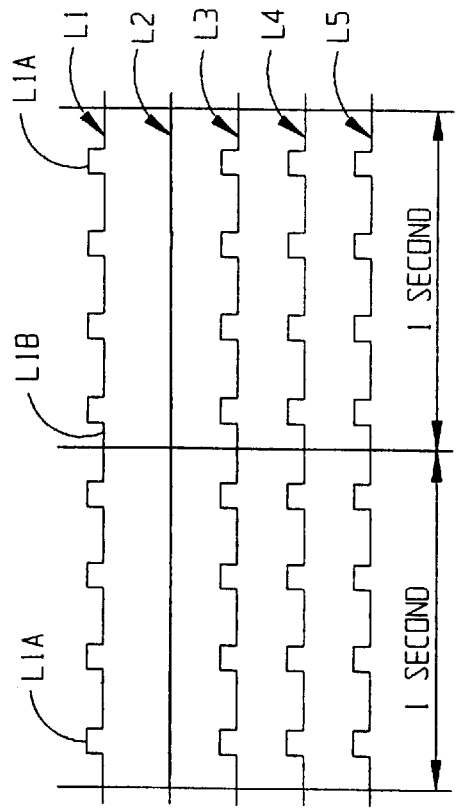
FIG. 3
FIG. 6

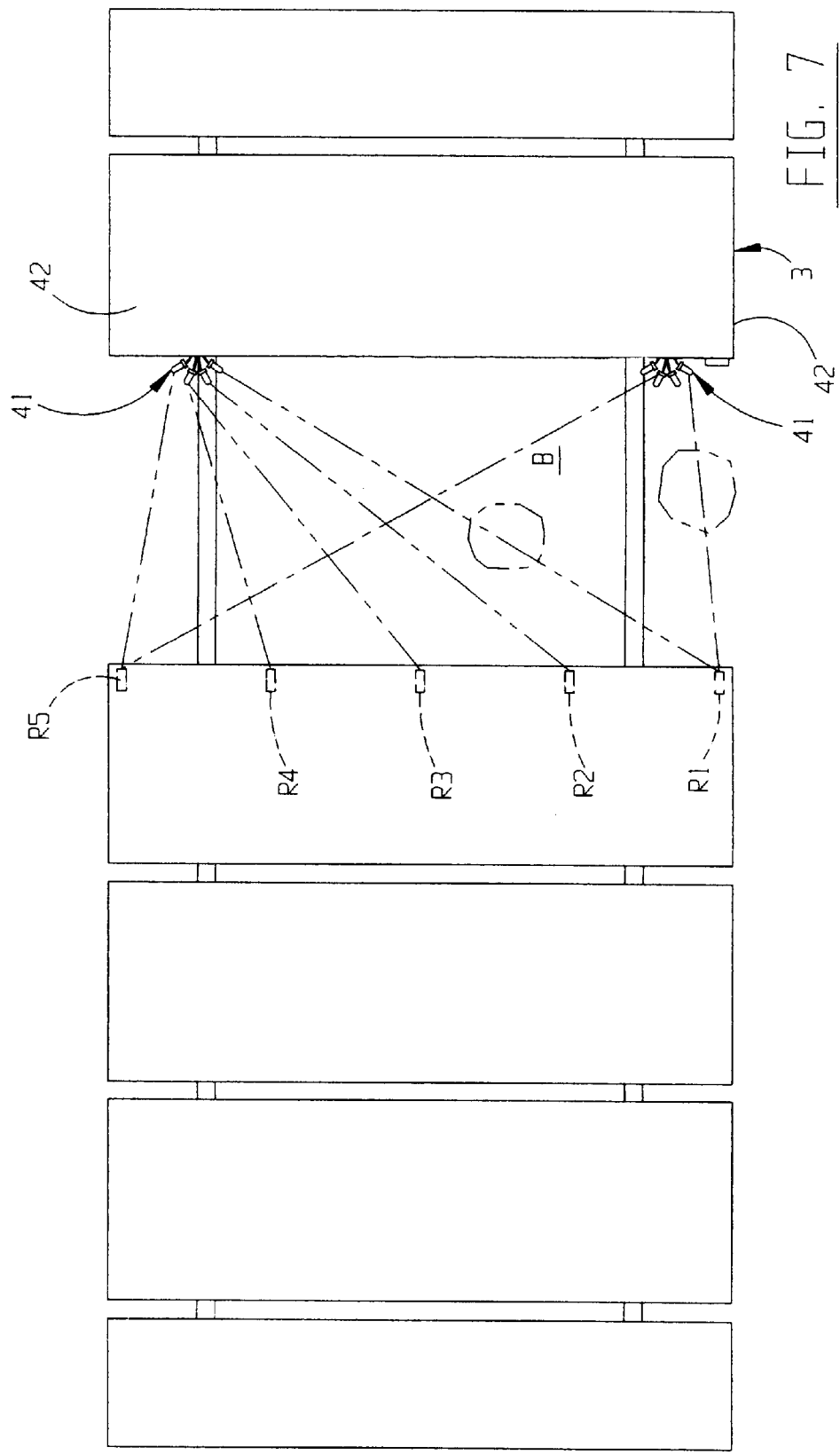

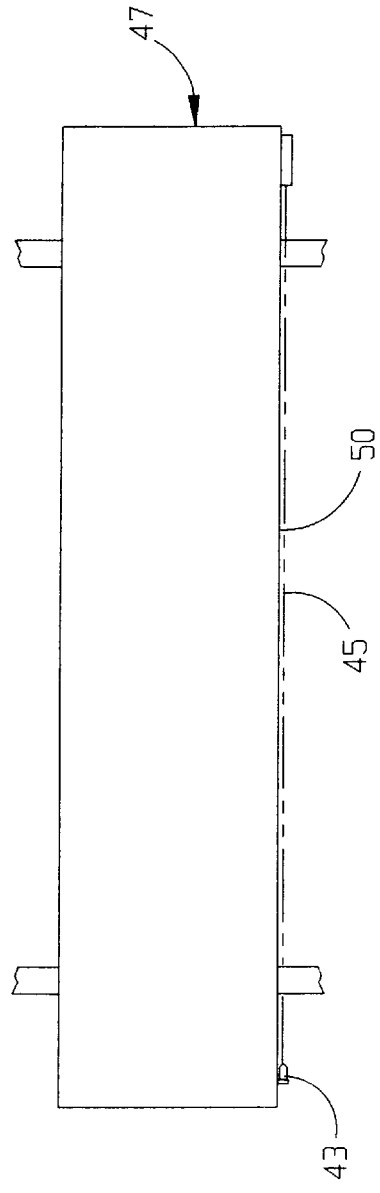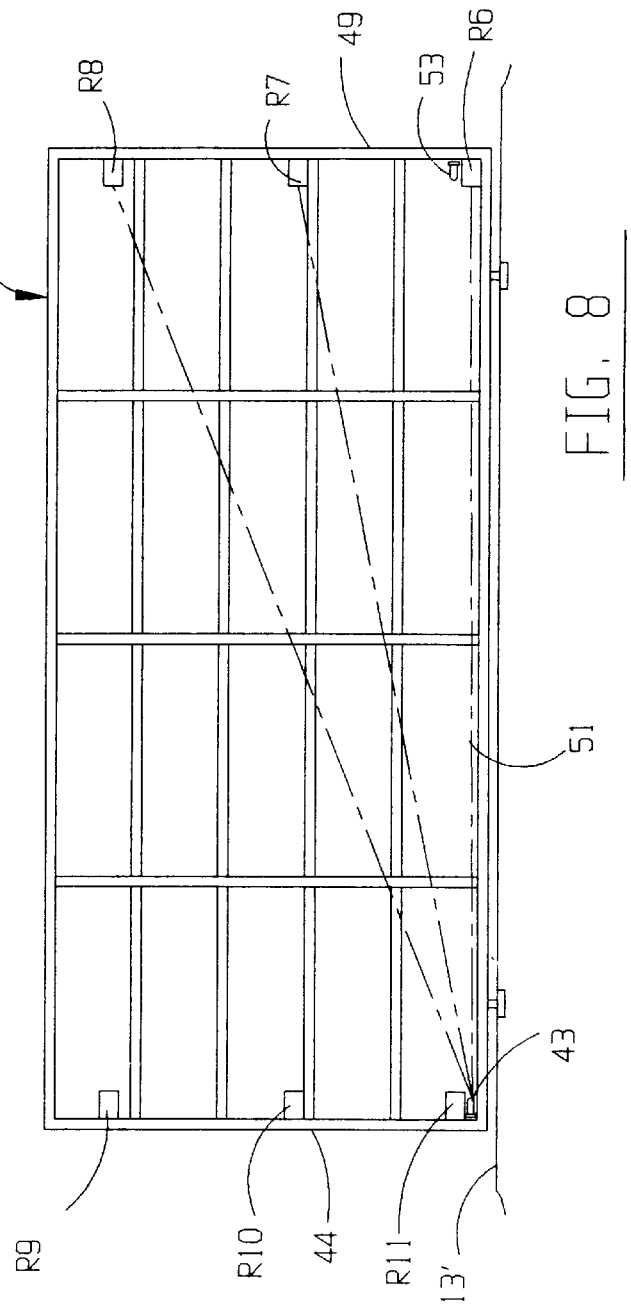

SAFETY SYSTEM WITH INTERMITTENT PHOTOELECTRIC BEAM

BACKGROUND OF THE INVENTION

1. Field of the Invention

This invention pertains to safety systems for mobile carriages, and more particularly to apparatus that employs photoelectric energy to prevent unintended movement of mobile carriages.

2. Description of the Prior Art

High density mobile systems for storing books, files, and other media are well known. In mobile storage systems, one or more mobile carriages roll along rails embedded in a building floor. As a mobile carriage moves, it opens or closes an aisle between it and an adjacent carriage or a stationary member such as a wall or end cabinet. It is essential that a mobile carriage not move to close an aisle if a person or object is in the aisle.

Accordingly, it is also well known to equip high density mobile storage with safety devices that prevent unintended mobile carriage movement. In particular, safety systems that use steady state photoelectric energy have become increasingly popular. Typical examples of photoelectric safety systems may be seen in U.S. Pat. Nos. 5,121,975; 5,359,191; 5,427,444; and 5,670,778. Although not directly related to high density mobile storage, the substrate detector of U.S. Pat. No. 5,266,812 involves generally similar technology.

An undesirable characteristic of the safety systems of the foregoing patents is that each requires a large number of photoelectric transmitters for the systems to achieve their purposes. The transmitters must be spaced at some minimum interval along a mobile carriage. For long mobile carriages, therefore, the number of transmitters can be quite large. For example, if a one foot spacing is required between transmitters, and a mobile carriage is twenty feet long, twenty-one transmitters are necessary. The prior systems also invariably require a photoelectric receiver for each transmitter. Such systems are quite expensive. Further, the large number of transmitters requires considerable electric power to operate. The modern trend in electrical design is to minimize the power requirements for electrical equipment and accessories. It therefore is undesirable to include more transmitters than is necessary in high density mobile storage applications.

Our co-pending U.S. patent application Ser. No. 08/969, 484 shows an exemplary safety system for high density mobile storage that requires only one photoelectric transmitter for an aisle. The single beam from the transmitter on a mobile carriage is reflected by a rotating mirror. The reflected beam cyclically sweeps the adjacent aisle and is detected by any of several photoelectric receivers on the other side of the aisle.

Despite recent advancements, continued development of safety systems for high density mobile storage is highly desirable.

SUMMARY OF THE INVENTION

In accordance with the present invention, a photoelectric safety system for preventing unintended movement of mobile carriages is provided that is simpler and more economical than prior systems. This is accomplished by apparatus that includes no moving parts and a minimum number of photoelectric transmitters.

The transmitters emit wide-angle beams into an aisle adjacent the mobile carriage. The transmitters are arranged in a cluster at a desired location on the mobile carriage. The beams are directed to cover the entire aisle.

As many photoelectric receivers as desired can be installed across the aisle from the transmitters. The receivers have a wide gathering angle for the beams. The result is that only a few transmitters are required, even with long mobile carriages, to adequately cover the aisle. Consequently, the power requirement for the system is much less than for prior systems of equal length mobile carriages.

To even further reduce the power requirements, the transmitters are not energized continuously. Rather, the transmitters are controlled by an appropriate circuit to cyclically turn on and off at a predetermined frequency. Consequently, the transmitters emit beams intermittently. The receivers therefore detect the presence of a beam in an intermittent fashion. That is, for each on-off cycle of the transmitters, the receivers detect a beam for a portion of the cycle, and the receivers do not detect a beam for the remainder of the cycle.

Each receiver is connected to a counter. The counter is reset each time the receiver detects a beam. Thus, the counter is reset at the same frequency that the transmitters emit the intermittent beams. The receiver counters are part of a control that is based on the state of the counter. As long as every counter is reset at the frequency of the transmitter beams, the control enables the mobile carriage to move. If, however, an object blocks a beam to any receiver, the counter of that receiver times out. The counter then changes state, and the control functions to prevent movement of the mobile carriage.

Further in accordance with the present invention, the photoelectric transmitters and receivers need not be on opposite sides of an aisle. On the contrary, space in an aisle close to the mobile carriage can be protected by installing both a transmitter and a receiver on that carriage. The transmitter is located at one end of the mobile carriage and directs the intermittent beam parallel to the length of the carriage. The receiver is installed at the opposite end of the mobile carriage. More than one receiver can be used to protect a portion of a vertical plane along the mobile carriage. By using transmitters at both ends of the mobile carriage and using multiple receivers on both carriage ends, practically the entire vertical plane adjacent the carriage can be protected.

The method and apparatus of the invention, using photoelectric transmitters that emit intermittent beams, thus requires minimum power and expense to prevent unintended movement of a mobile carriage. The probability of failure to detect a person or object in an aisle adjacent the mobile carriage is remote, even though only a small number of transmitters are used.

Other advantages, benefits, and features of the present invention will become apparent to those skilled in the art upon reading the detailed description of the invention.

BRIEF DESCRIPTION OF THE DRAWINGS

FIG. 1 is an end view of typical high density mobile storage that includes the present invention.

FIG. 2 is a top view of FIG. 1.

FIG. 3 is a view on an enlarged scale taken along line 3—3 of FIG. 1.

FIG. 4 is a schematic drawing of beams emitted by photoelectric transmitters as detected by photoelectric receivers.

FIG. 6 is a schematic drawing similar to FIG. 4, but showing one of the receivers blocked from detecting a photoelectric beam.

FIG. 7 is a view generally similar to FIG. 2, but showing a modified embodiment of the invention.

FIG. 8 is a front view of a mobile carriage equipped with the safety system of the invention to protect a vertical plane proximate the carriage.

FIG. 9 is a top view of FIG. 8.

DETAILED DESCRIPTION OF THE PREFERRED EMBODIMENT

Figure 5:
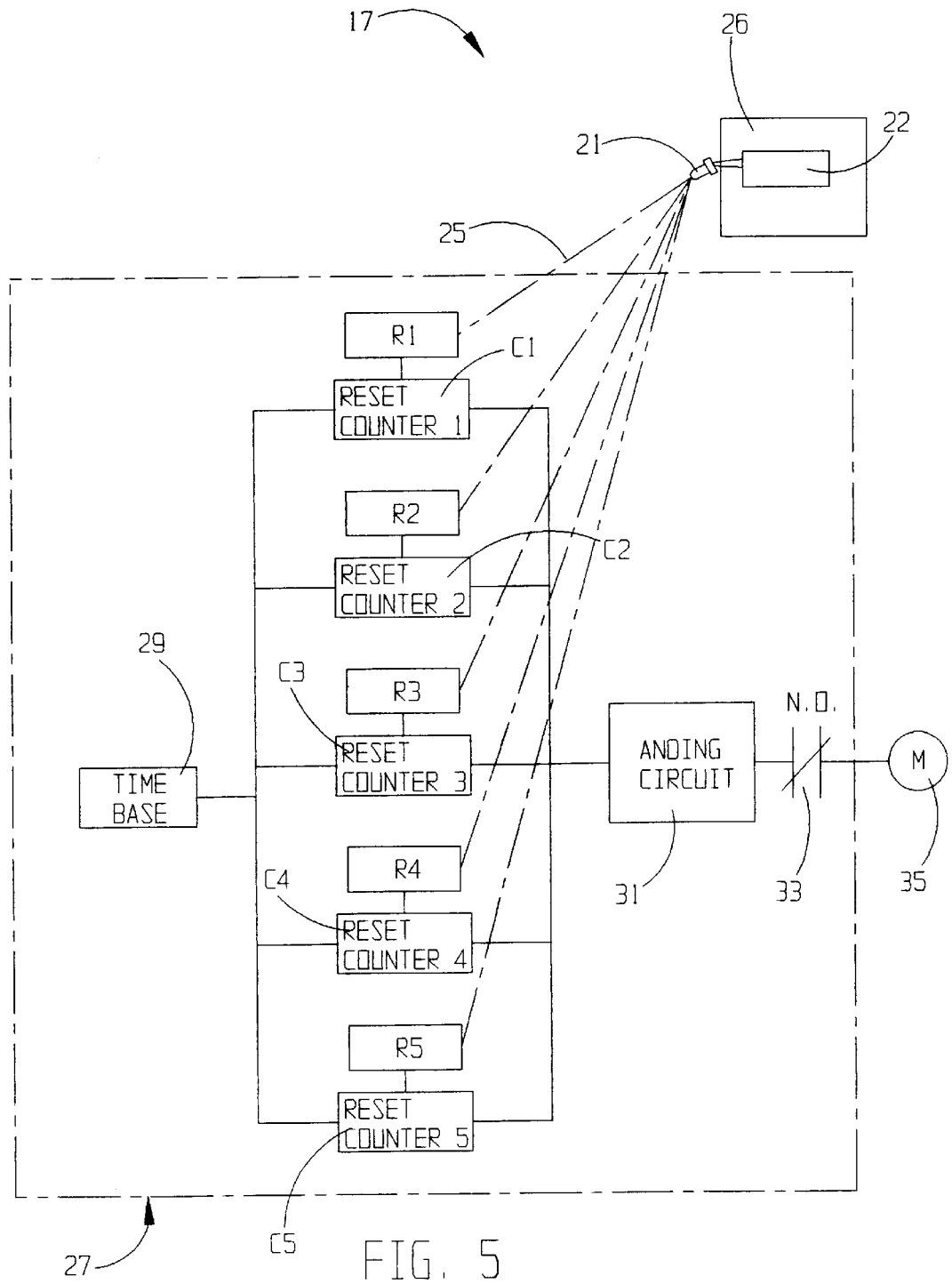
FIG. 5 is a schematic diagram of the control of the invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1 and 2, a typical installation of high density mobile storage 1 is illustrated that includes the present invention. However, it will be understood that the invention is not limited to use in applications involving moveable components.

In the particular high density mobile storage 1 shown, four mobile carriages 3, 5, 7, and 9 are rollable in the directions of arrow 10 along rails 11 embedded in a building floor 13. The mobile carriages 3, 5, 7, and 9 are powered independently of each other by respective electric motors and associated drive mechanisms, not shown but well known in the art. As illustrated, there is a stationary end cabinet 15 at both ends of the high density mobile storage 1. However, there may be a wall or other stationary member in place of one or both cabinets 15. Moving the mobile carriages opens and closes aisles A, B, C, D, and E between adjacent carriages and the end cabinets.

In accordance with the present invention, a cyclically operating photoelectric safety system 17 is incorporated into the high density mobile storage 1. The photoelectric safety system 17 is designed and functions to prevent closing of a aisle if a person or object is in the aisle. For clarity purposes, a safety system is shown installed only on mobile carriage 3 and only in association with aisle B. It will be appreciated, of course, that the safety system is duplicated for each of the other mobile carriages 5, 7, 9 and the other aisles A, C, D, E.

The safety system 17 is comprised of a cluster 19 of photoelectric transmitters 21. In keeping with the spirit of the invention, the number of transmitters 21 in a cluster 19 is kept to a minimum. The actual number of transmitters is dependent on the length of the mobile carriage. However, the function and operation of the invention is not dependent on the number of transmitters employed. In the particular construction illustrated, there are four transmitters 21A, 21B, 21C, and 21D in the cluster on mobile carriage 3. Also see FIG. 3. Transmitters having an angle of emission T of 23 degrees are preferred. The transmitters 21A–21D are connected to a circuit board 22 by respective rather stiff wires 23A–23D. The wires 23A–23D are bendable so as to direct the beams 25 from the transmitters in the desired directions. As illustrated, the beams 25 are directed toward a number of photoelectric receivers R located across the bottom of the mobile carriage 5 across the aisle B from the mobile carriage 3. As many receivers R as necessary to protect the entire aisle can be used. The operation of the safety system 17 is not dependent on the number of receivers. For illustrative purposes, five receivers R1–R5 are shown. Receivers having a 45 degree angle of detection S work very well.

It will be noticed that the numbers of receivers R and transmitters 21 are not equal. In fact, it is contemplated that the number of receivers will always be greater than the number of transmitters. The only requirement regarding receiver number and placement is that every receiver must always detect a beam from at least one transmitter.

The circuit board 22 is part of an appropriate circuit 26, FIG. 5, that controls the transmitters 21A–21D. Specifically, the circuit 26 controls the transmitters to simultaneously emit beams 25 of photoelectric light in an intermittent fashion. The frequency of beam emission can be varied to suit different operating conditions, but it is anticipated that a frequency of approximately two to four hz will be commonly used. The time during which the transmitters emit beams is preferably less than the time the transmitters are not emitting beams. That is, for each on-off cycle, the transmitters are off for at least as long as they are on.

The receivers R simultaneously detect the intermittent beams 25 emitted by the transmitters 21. For each cycle, therefore, the receivers fail to detect a beam for as long a time as they do detect a beam. FIG. 4 shows in schematic form the detection of the beams by the receivers. The lines L1–L5 represent the status of the receivers R1–R5, respectively. In FIG. 4, the frequency of beam emission by the transmitters is four hz. The portions L1A of the line L1 represent times when a beam is detected by the receiver R1. Portions L1B represent times when the receiver R1 does not detect a beam.

FIG. 5 shows a diagram of the control 27 for the safety system 17. The control 27 includes a counter C1–C5 associated with each respective receiver R1–R5. Each counter C1–C5 counts a pulse train sent from a time base 29 that is common to all the receivers. The time base 29 generates a continuous stream of high-low pulses. The frequency of the time base pulses is adjustable to suit the other requirements of the safety system. Each receiver is connected to the reset line of its counter. The output of the counters are connected to a common anding circuit 31. In turn, the anding circuit 31 is connected through a normally open relay 33 to the motor 35 of the particular mobile carriage 3, 5, 7, or 9.

The counters C1–C5 of the respective receivers R1–R5 are pre-set at a number that is related to the frequency of the beams 25 emitted by the transmitters 21A–21D. When a counter receives the pre-set number of pulses from the time base 29, the counter times out and changes state. However, the counters are reset each time an emitted beam strikes the associated receivers R1–R5. As long as the frequency of the emitted beams striking a particular receiver is high enough to prevent the associated counter from reaching the pre-set number, the anding circuit 31 functions to keep the relay 33 closed. For example, the frequency of the beam emission may be four hz. In that case, the receiver counters may be pre-set at the number three, and the time base frequency is set at three hz. As long as a beam continues to strike all the receivers four times each second, the counters never time out to open the relay. The motor 35 is thus able to energize and move the mobile carriage 3.

On the other hand, if a person or object, such as object 37 in FIG. 2, is in the aisle B, no beam 25 will strike the receiver R2. That situation is shown in FIG. 6. With no signals L1A from the receiver R2 reaching the counter C2, the counter is not reset before the pre-set number of pulses from the time base 29 arrive at the counter. Consequently, the counter times out, and it changes state. The relay 33 opens to prevent energization of the motor 35 and thereby prevent movement of the mobile carriage 3.

It is an important benefit of the safety system 17 that an object that might be undetected at a certain width of an aisle will become detected as the aisle closes. In FIG. 2, an object 39 initially is out of the path of the beam 40. However, as the aisle B closes the angle between the transmitters 21A–21D and the receiver R1 changes, and eventually the object 39 will come into the path of the beam 40. At that point, the object 39 is detected.

To more quickly detect an object or person at any place within an aisle, two clusters 41 can be used on the mobile carriage 3, FIG. 7. In that situation, a cluster 41 is located near each end 42 of the mobile carriage. The transmitters of the two clusters emit beams simultaneously. The same number of receivers R can be used, and they can be in the same locations, as with the single cluster installation 19 of FIGS. 1 and 2. No change to the control 27 is necessary for multiple clusters of transmitters, because operation of the invention is based on beam detection by the receivers R, and not by the number of emitted beams.

Further in accordance with the present invention, a receiver can be on the same mobile carriage as the associated transmitter. Looking at FIGS. 8 and 9, a transmitter 43 is located at one end 44 of a mobile carriage 47 near the floor 13'. A receiver R6 is installed at the opposite end 49 of the mobile carriage 47 near the floor 13'. The photoelectric beam 51 from the transmitter 43 protects the region close to the mobile carriage and close to the floor. Additional receivers, such as receivers R7 and R8, can be installed at the end 49 of the mobile carriage. Unless the mobile carriage is very short, a single transmitter 43 is usually sufficient to cover most of the plane 45 parallel and close to the front face 50 of the mobile carriage. Adding a second photoelectric transmitter 53 and receivers R9, R10, and R11 will result in almost all the plane 45 being protected.

In summary, the results and advantages of photoelectric protection systems can now be more fully realized. The safety system of the invention, as applied to high density mobile storage, provides both low power consumption as well as exceptional versatility. This desirable result comes from using the combined functions of the photoelectric transmitters and the control 27. By using wide-angle transmitters and receivers, only one or a few transmitters are needed to protect a long aisle. Consequently, the power consumption for the system is minimal. Cyclically turning the transmitters on and off further reduces power consumption. All the receivers simultaneously detect the intermittent beams from the transmitters. If an object blocks any receiver from detecting an intermittent beam from at least one transmitter, a counter associated with that receiver times out and prevents movement of a mobile carriage. The system of the invention can be used equally well for cross aisle multi-directional protection and for protecting a single vertical plane close to a mobile carriage.

It will also be recognized that in addition to the superior performance of the cyclical safety system of the invention, its construction is such as to be more economical than prior mobile carriage safety systems. Also, because mechanical components have practically been eliminated, the need for maintenance is minimal.

Thus, it is apparent that there has been provided, in accordance with the invention, a safety system with intermittent photoelectric beam that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations of the invention as fall within the spirit and broad scope of the appended claims.

What is claimed is:

1. A photoelectric safety system for use with a mobile carriage having a top and opposed ends and moveable along a floor adjacent an aisle that opens and closes in response to movement of the mobile carriage comprising:

a. a plurality of transmitters arranged solely in a closely spaced cluster at a single predetermined location on the mobile carriage, the transmitters emitting respective beams across the aisle;

b. circuit means for controlling the transmitters to emit the beams therefrom intermittently at a predetermined frequency;

c. a number of photoelectric receivers equal to at least one greater than the number of the photoelectric transmitters and located across the aisle from the mobile carriage, each receiver being located to detect the intermittent beam emitted from at least one transmitter; and d. control means for cooperating with the receivers to enable the mobile carriage to move so long as every receiver detects the intermittent beam from at least one transmitter at the predetermined frequency and to prevent the carriage from moving when any receiver does not detect a beam from at least one transmitter.

2. A photoelectric safety system for use with a mobile carriage having a top and opposed ends and moveable along a floor adjacent an aisle that opens and closes in response to movement of the mobile carriage comprising:

a. at least one photoelectric transmitter located on the mobile carriage and directed to emit a beam across the aisle;

b. circuit means for controlling the transmitter to emit each beam intermittently at a predetermined frequency;

c. a number of photoelectric receivers equal to at least one greater than the number of the photoelectric transmitters and located across the aisle from the mobile carriage, each receiver being located to detect the intermittent beam emitted from at least one transmitter; and d. control means for cooperating with the receivers to enable the mobile carriage to move so long as every receiver detects the intermittent beam from at least one transmitter at the predetermined frequency and to prevent the carriage from moving when any receiver does not detect a beam from at least one transmitter; wherein the control means comprises:

i. a counter in operative association with each receiver and operable between a first state and a second state, each receiver sending a respective signal at the predetermined frequency to reset the associated counter in response to the receiver detecting an intermittent beam at the predetermined frequency and to maintain the counter at the first state thereof;

ii. time base means for generating a continuous stream of pulses and for sending the pulses to each counter to cause each counter to change from the first state to the second state when a pre-set number of pulses reach the counter, the predetermined frequency of the intermittent beam being sufficiently high to prevent the pre-set number of pulses from the time base means from reaching the counter before a signal from the receiver resets the counter, the pre-set number of pulses from the time base means reaching each counter to change the state thereof from the first state to the second state when an object blocks the associated receiver from detecting an intermittent beam for a time sufficient for the pre-set number of pulses to reach the counter; and iii. means for preventing the mobile carriage from moving when any counter has changed from the first state to the second state.

3. The photoelectric safety system of claim 1 wherein all the transmitters emit respective intermittent beams simultaneously, so that all the receivers detect the intermittent beams simultaneously.

4. The photoelectric safety system of claim 1 wherein:
a. the cluster of transmitters is located at a midpoint and near the top of the mobile carriage; and
b. the receivers are located close to the floor.

5. The photoelectric safety system of claim 1 wherein each transmitter has an angle of emission of approximately 25 degrees, and wherein each receiver has an angle of reception of approximately 45 degrees.

6. High density mobile storage comprising:
a. at least one mobile carriage selectively moveable along a floor to close an aisle adjacent the carriage;
b. a first plurality of photoelectric transmitters arranged in close proximity to each other in a cluster mounted at a single location to the mobile carriage, the transmitters simultaneously emitting respective intermittent photoelectric beams cyclically at a predetermined frequency between an on condition and an off condition into the aisle;
c. a number of photoelectric receivers at least one greater than the number of transmitters located across the aisle from the mobile carriage, each receiver detecting the intermittent beam at the predetermined frequency from at least one transmitter when no object is in the aisle; and
d. control means for enabling the mobile carriage to move in response to each of the receivers detecting the intermittent beam from at least one transmitter and for preventing the carriage from moving in response to any receiver failing to detect the intermittent beam from at least one transmitter, so that the mobile carriage does not move if an object in the aisle blocks any receiver from detecting the intermittent beam from at least one transmitter.

7. The high density mobile storage of claim 6 wherein:
a. at least one receiver is installed on the mobile carriage; and
b. at least one receiver is installed on a selected member across the aisle from the mobile carriage.

8. High density mobile storage comprising:
a. at least one mobile carriage selectively moveable along a floor to close an aisle adjacent the carriage;
b. at least one photoelectric transmitter mounted to the mobile carriage and emitting an intermittent photoelectric beam cyclically at a predetermined frequency between an on condition and an off condition into the aisle;
c. a number of photoelectric receivers at least one greater than the number of transmitters, each receiver being installed to detect the intermittent beam at the predetermined frequency from at least one transmitter; and
d. control means for enabling the mobile carriage to move in response to each of the receivers detecting the intermittent beam from at least one transmitter and for preventing the carriage from moving in response to any receiver failing to detect the intermittent beam from at least one transmitter, wherein:

i. a time base sends a continuous stream of pulses to each of a plurality of counters operatively associated with the respective receivers, each counter changing from a first state to a second state when a predetermined number of pulses reaches the counter, each counter cooperating with an electric motor to enable movement of the mobile carriage when all the counters are in the respective first states thereof, the counters cooperating with the electric motor to prevent movement of the carriage when any counter changes to the first state thereof;

ii. each receiver resets its associated counter to the first state thereof each time the receiver detects an intermittent beam from a transmitter; and iii. each transmitter emits the intermittent beam at a predetermined frequency sufficient to reset the counters to the respective first states thereof before the pre-set number of pulses from the time base reaches each counter, so that the mobile carriage is enabled to move as long as each receiver detects the intermittent beam from at least one transmitter at the predetermined frequency.

9. The high density mobile storage of claim 6 wherein each transmitter is always in the off condition for as long as it is in the on condition during each cycle of the intermittent beam.

10. A method of protecting an object in an aisle adjacent a mobile carriage comprising the steps of:
a. simultaneously cyclically emitting a plurality of intermittent beams from a respective plurality of photoelectric transmitters into the aisle at a predetermined frequency;
b. simultaneously detecting at least one intermittent beam by each of a number of photoelectric receivers that is greater than the number of transmitters; and
c. enabling the mobile carriage to move in response to each receiver detecting the intermittent beam at the predetermined frequency from at least one transmitter, wherein the step of enabling the mobile carriage to move comprises the steps of:
 i. setting a counter associated with each receiver at a pre-set number;
 ii. continuously sending a stream of pulses to the counters to reach the pre-set number;
 iii. changing the counters from a first state to a second state when the pre-set number of pulses reaches the counters; and
 iv. cyclically resetting the counters before the pre-set number of pulses reaches the counters for as long as each receiver detects at least one intermittent beam at the predetermined frequency, so that the counters do not change from the first state to the second state as long as all the receivers detect at least one intermittent beam at the predetermined frequency.

11. The method of claim 10 comprising the further steps of:
a. blocking at least one receiver from detecting any intermittent beam at the predetermined frequency;
b. reaching the pre-set number on the counter of the blocked receiver with the stream of pulses;
c. changing the state of the counter of the blocked receiver; and
d. preventing the mobile carriage from moving.

* * * * *